US009775191B2

(12) United States Patent
Jayasimha et al.

(10) Patent No.: US 9,775,191 B2
(45) Date of Patent: Sep. 26, 2017

(54) PHYSICAL LAYER HAND-OFF AND DIVERSITY COMBINING IN NON-GEOSTATIONARY SATELLITE CONSTELLATION

(71) Applicant: EMC SatCom Technologies LLC, Miami, FL (US)

(72) Inventors: Sriram Jayasimha, Bangalore (IN); Jyothendar Paladugula, Hyderabad (IN); Praveen K. Tangutoori, Hyderabad (IN)

(73) Assignee: Global Eagle Entertainment Inc., Los Angeles, CA (US)

( * ) Notice: Subject to any disclaimer, the term of this patent is extended or adjusted under 35 U.S.C. 154(b) by 0 days.

(21) Appl. No.: 14/979,261

(22) Filed: Dec. 22, 2015

(65) Prior Publication Data
US 2017/0086255 A1    Mar. 23, 2017

Related U.S. Application Data

(60) Provisional application No. 62/220,659, filed on Sep. 18, 2015.

(51) Int. Cl.
*H04W 84/06*    (2009.01)
*H04B 7/185*    (2006.01)
*H04B 7/04*    (2017.01)

(52) U.S. Cl.
CPC ............. *H04W 84/06* (2013.01); *H04B 7/04* (2013.01); *H04B 7/18519* (2013.01)

(58) Field of Classification Search
None
See application file for complete search history.

(56) References Cited

U.S. PATENT DOCUMENTS

| 5,640,414 | A | * | 6/1997 | Blakeney, II | H04W 36/18 370/332 |
| 5,978,365 | A | * | 11/1999 | Yi | H03M 13/6381 370/331 |
| 9,130,644 | B2 | * | 9/2015 | Jayasinha | |
| 2014/0273815 | A1 | * | 9/2014 | Jayasimha | H04B 7/18521 455/13.2 |

OTHER PUBLICATIONS

Henry, C., "New LeoSat CEO Talks Vision for Company," Sep. 16, 2015, Feature, North America, Regional, Satellite Today News Feed, Telecom, retrieved online, http://www.satellitetoday.com/telecom/2015/09/16/new-leosat-ceo-taks-vision-for-company/?hqe=el&hq m=3151642&hq l=1&hq v=83d89d3212, 3 pages.

* cited by examiner

*Primary Examiner* — Diane Mizrahi
(74) *Attorney, Agent, or Firm* — SoCal IP Law Group LLP; Jonathan Pearce; John E. Gunther

(57) ABSTRACT

At least two antennas are used for make-before-break communications over non-geostationary satellites. An SHDC device provides physical layer seamless hand-off and obtain diversity signal-to-noise ratio (SNR) gain. When additional antennas are available for standby or other reasons, it may be beneficial for a number of satellite antennas to collectively utilize additional SHDC devices to achieve higher diversity SNR gains under normal operational considerations. The asymptotic SNR gains are those obtained when receiver antenna noise dominates transponder and sky noises. According to exemplary embodiment of the present invention, N satellite antennas may collectively utilize N−1 SHDC devices. For example, 3 satellite antennas may collectively utilize 2 SHDC devices.

25 Claims, 7 Drawing Sheets

SHDC on a moving platform

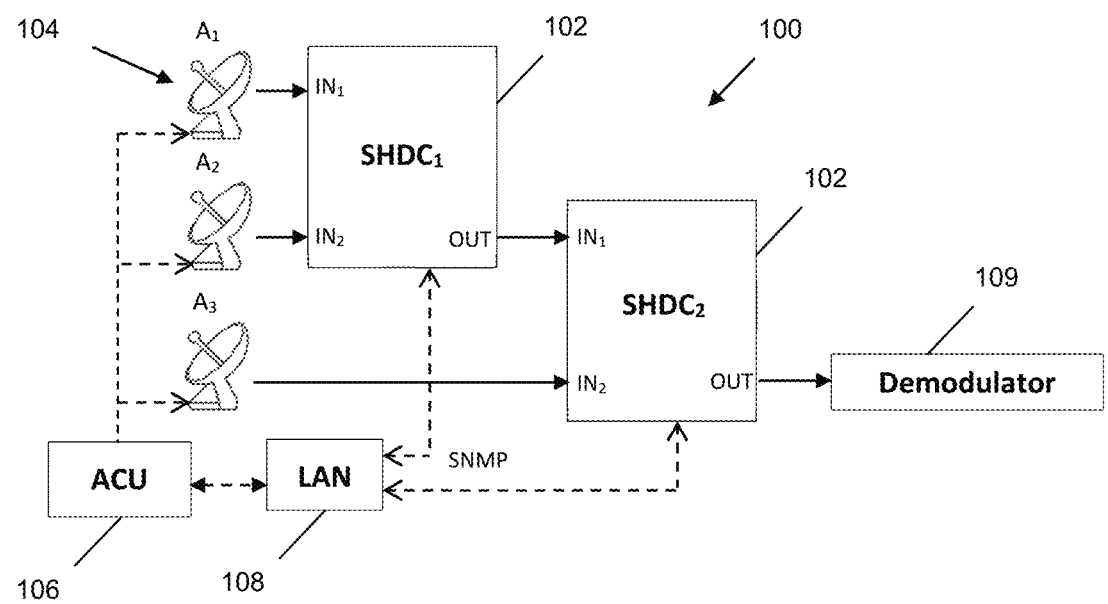
Fig. 1: 3-Antenna SHDC

| Pass | Phase | Antenna 1 | Antenna 2 | Antenna 3 |
|---|---|---|---|---|
| Even Pass (Pass-A) | Handover | 5, A₁ | A₂ | A₃, 10 |
| | After handover | 5 | | |
| | Beginning of Diversity Combining | | | |
| | End of Diversity Combining | | | |
| | Prepare for handover | | | |
| Odd Pass (Pass-B) | Handover | 5 | | 10 |
| | After handover | 5 | | |
| | Beginning of Diversity Combining | | | |
| | End of Diversity Combining | | | |
| | Prepare for handover | | | |

Fig. 2(a) — Fig. 2(j)

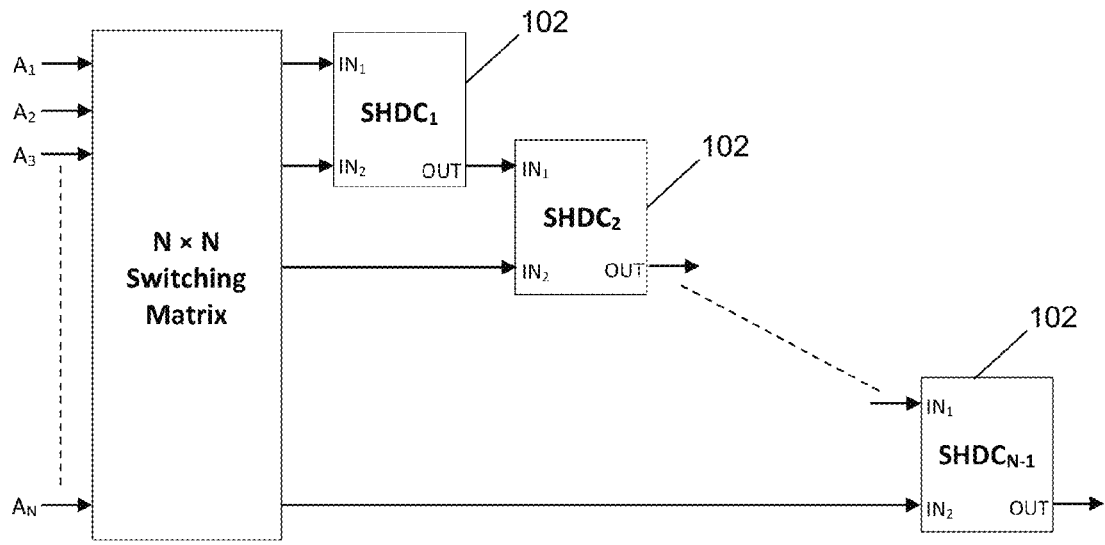
Fig. 3(a) – High Latency *N*-Antenna SHDC
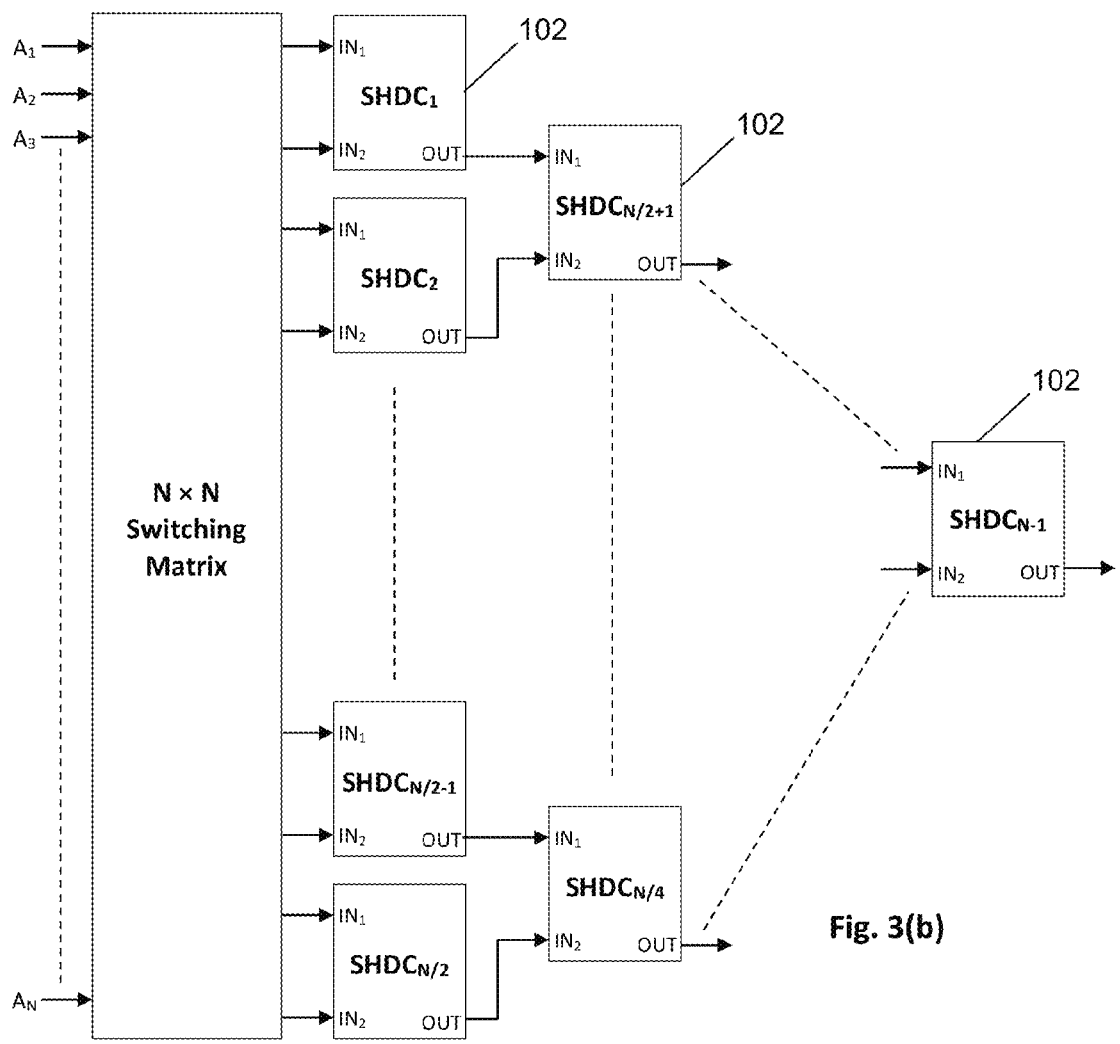
Fig. 3(b)

 
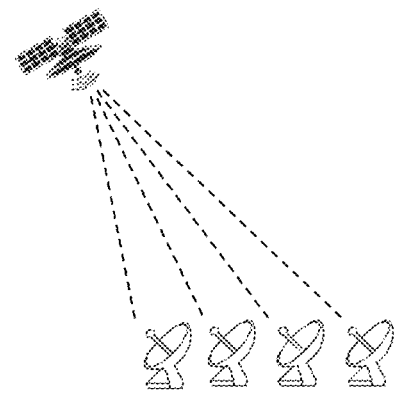
Fig. 4(a) SHD   Fig. 4(b) DC
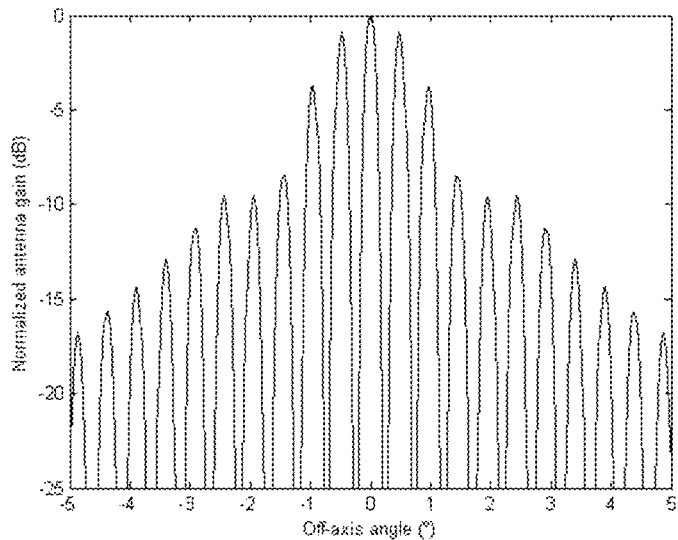
Fig. 4(c) Post combining receive antenna pattern

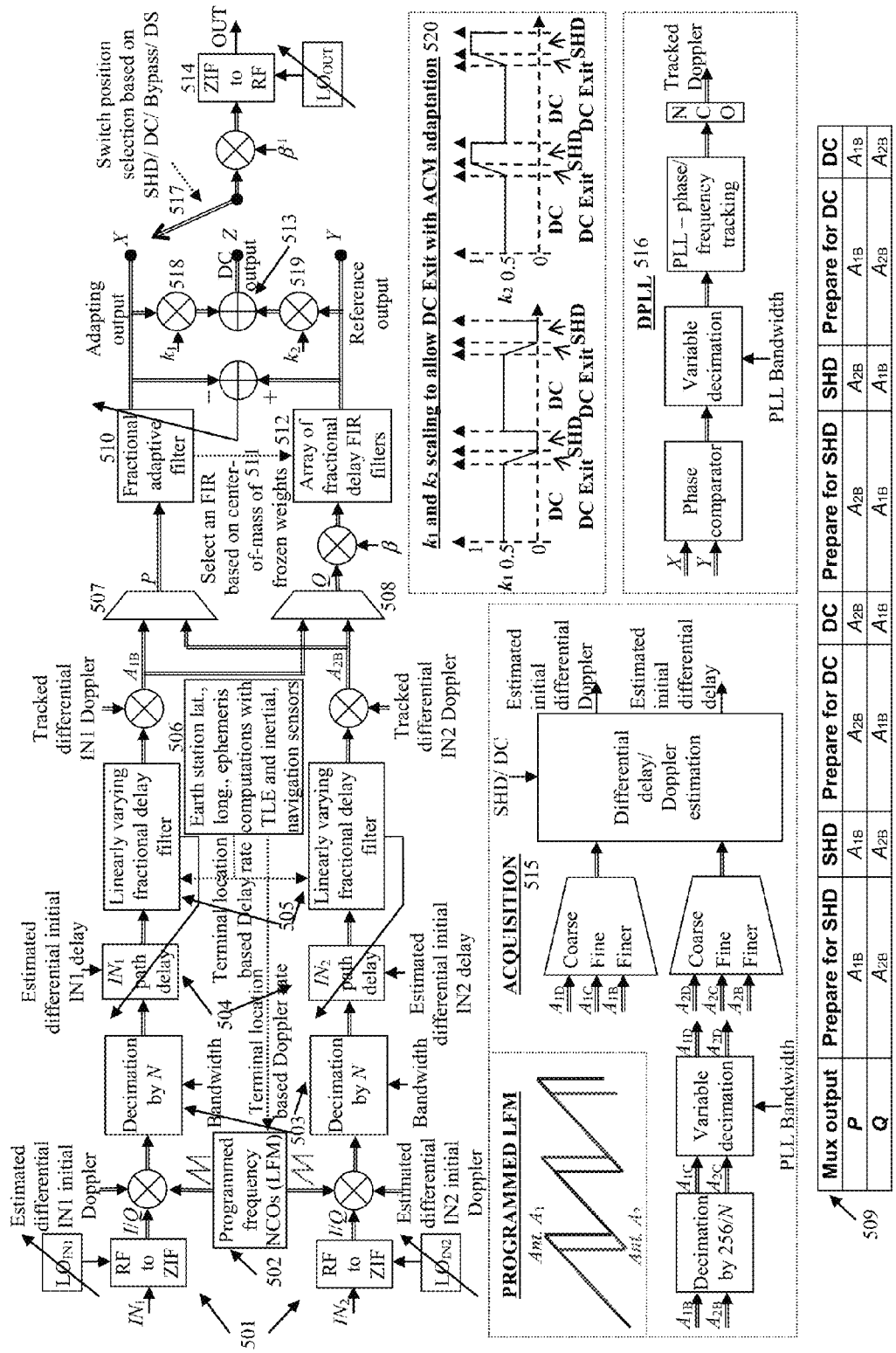
Fig. 5 – Signal processing blocks of SHDC device to achieve both SHD and DC functionalities

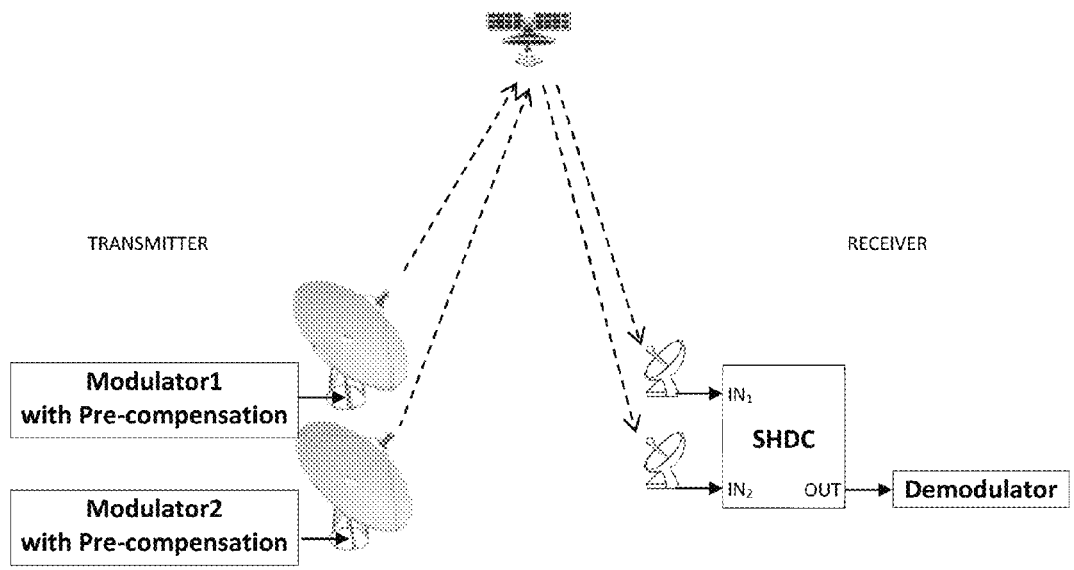
Fig. 6 – SHDC with pre-compensation at the transmitter and off the shelf demodulator at the receiver
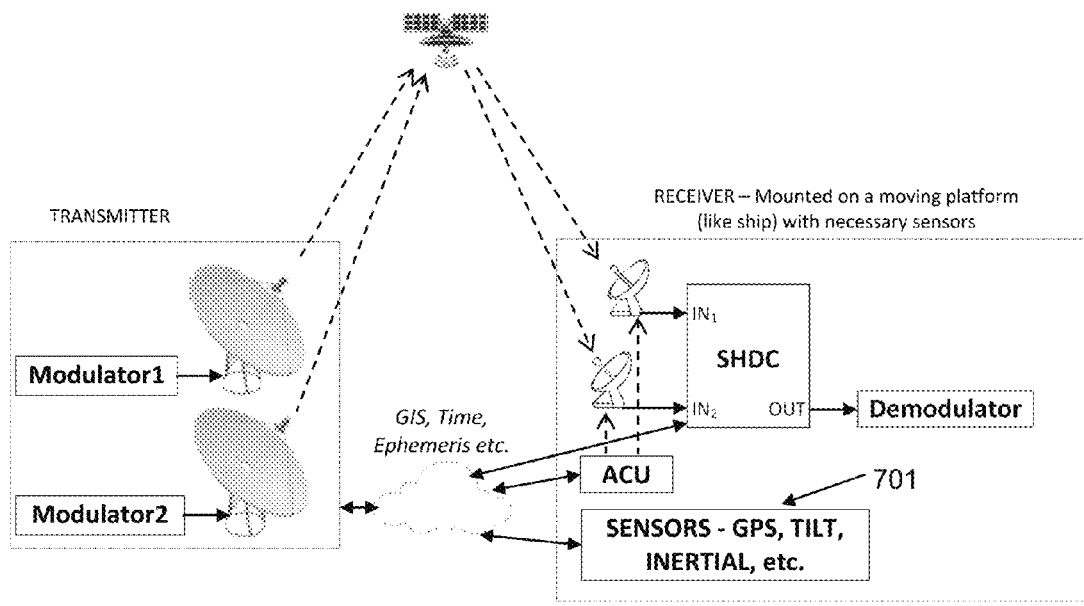
Fig. 7 – SHDC on a moving platform

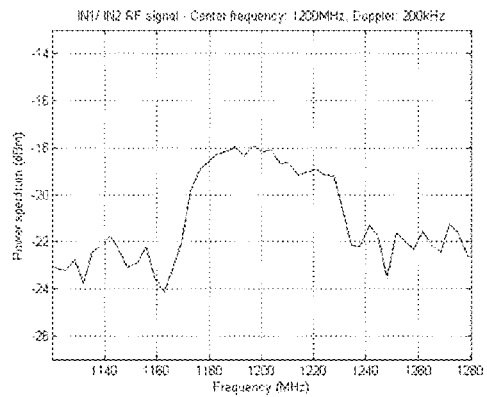
Fig. 8(a) RF signal (FIG. 5 501 input)
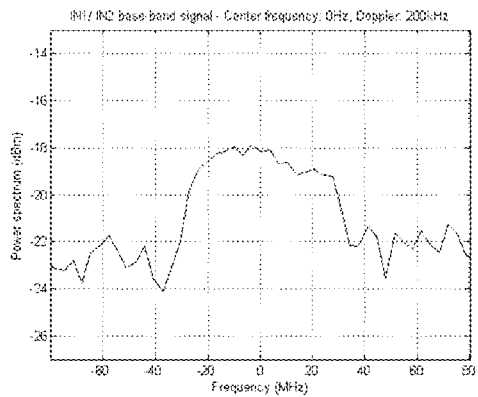
Fig. 8(b) base-band signal with Doppler (FIG. 5 502 input)
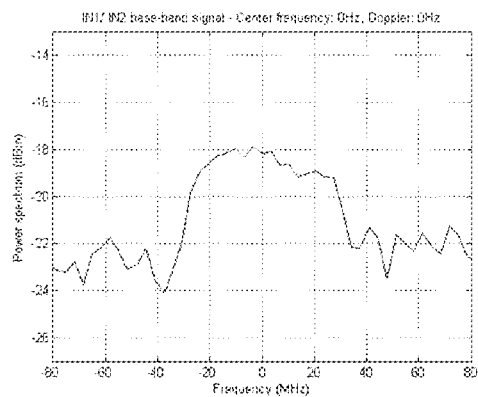
Fig. 8(c) base-band signal without Doppler (FIG. 5 503 input)
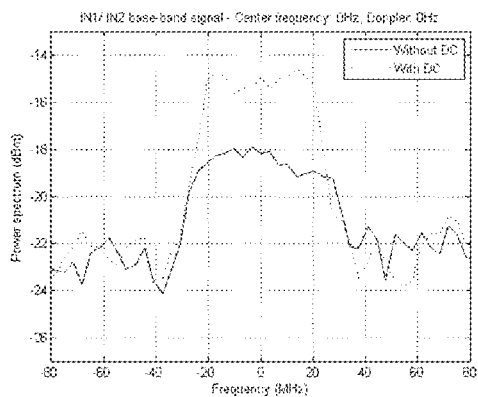
Fig. 8(d) base-band signal at output switch (FIG. 5 517 output)
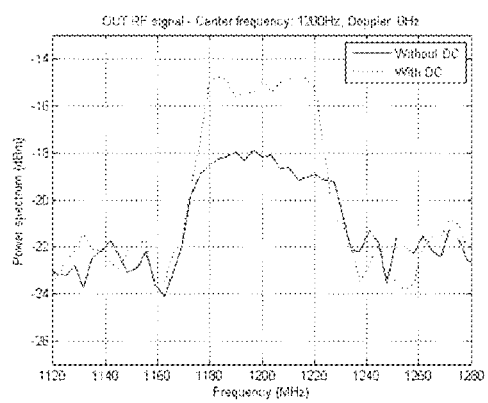
Fig. 8(e) OUT RF signal (FIG. 5 514 output)

PHYSICAL LAYER HAND-OFF AND DIVERSITY COMBINING IN NON-GEOSTATIONARY SATELLITE CONSTELLATION

RELATED APPLICATION

This application claims the benefit of U.S. Provisional Application No. 62/220,659, filed Sep. 18, 2015, the entire contents of which are incorporated herein by reference.

BACKGROUND OF THE INVENTION

Field of the Invention

The present invention relates to non-geostationary (non-GEO) satellite (usually medium-earth orbit, MEO, or low-earth orbit, LEO) constellation hand-off (SHD) and diversity-combining (DC) device, the combination being referred to as an SHDC device, used by earth-station satellite receivers.

Background of the Related Art

In U.S. Pat. No. 9,130,644 (the '644 Patent), satellite antennas 14, 24 may include a SHDC device that has both a seamless satellite hand-off device (SHD) 30 (see FIGS. 2, 5) and a diversity combiner (DC) 50 (see FIGS. 3, 5). An Antenna Controller Unit (ACU) controls the sequence of antenna movements including hand-off (e.g., FIGS. 1(a) and 1(b)), tracking the satellite 5 as it continues in its orbit (e.g., FIGS. 1(b) and 1(c)), and the left antenna 14 dropping its signal with the current satellite 5 and beginning to move to find a new ascending satellite (e.g., FIG. 1(d)). This physical layer method of hand-off avoids use of any overheads (pilots, time-stamps, etc.) that are required by other types of hand-off schemes. Hand-offs in LEO satellite constellations occur much more frequently than in MEO satellite constellations. Hence, the duty cycle of the DC goes down, but it is still better than not doing DC at all. U.S. Pat. No. 9,130,644 is hereby incorporated by reference.

SUMMARY

To avoid losing data, at least one antenna must continue to point to the descending satellite while another antenna acquires the rising satellite (this is referred to here as "make-before-break"). At least two antennas are used for make-before-break communications over non-geostationary satellites. The '644 Patent details the approach for physical layer seamless hand-off and to obtain diversity signal-to-noise ratio (SNR) gain with an SHDC device. When additional antennas are available for standby or other reasons, it may be beneficial for a number of satellite antennas to collectively utilize additional SHDC devices to achieve higher diversity SNR gains under normal operational considerations. The DC SNR gains that are mentioned hereafter are best-case (when receiver antenna noises—that add non-coherently (don't add up in the same phase, leading to lesser gain—overwhelm transponder and sky noises which correlate in the two antennas). In addition to noise, antennas may also receive interference from other satellites (GEO, MEO or LEO). For example, interference from GEO satellites to equatorial MEO-satellite tracking antennas is location-dependent (more likely at equatorial antenna locations) and transient. During DC, we also expect a similar gain (in the same manner as noise) when interference (e.g., from GEO satellites) is also present. According to an exemplary embodiment of the present invention, N satellite antennas may collectively utilize N−1 SHDC devices. For example, 3 satellite antennas may collectively utilize 2 SHDC devices.

BRIEF DESCRIPTION OF THE FIGURES

FIG. 1 is an overview illustrating a 3-antenna SHDC device, according to an exemplary embodiment of the present invention.

FIGS. 2(a)-2(j) illustrate hand off for the 3-antenna SHDC of FIG. 1.

FIGS. 3(a) and 3(b) are an overview illustrating an N-antenna receiver with N−1 SHDC devices (also referred to as an N antenna SHDC device), according to an exemplary embodiment of the present invention; where FIG. 3(a) is a high latency N-antenna SHDC and FIG. 3(b) is a low latency N-antenna SHDC.

FIGS. 4(a) and 4(b) are views of a satellite hand-off and diversity combining for an N-antenna SHDC device, according to an exemplary embodiment of the present invention.

FIG. 4(c) illustrates a post-DC receive pattern.

FIG. 5 illustrates the signal processing blocks of an SHDC device, according to an exemplary embodiment of the present invention.

FIG. 6 is an illustration of pre-compensation at the transmitter.

FIG. 7 illustrates the concept of SHDC device on a moving platform, according to an exemplary embodiment of the present invention.

FIGS. 8(a)-8(e) illustrate the frequency conversions and diversity combing of input signals at various stages in SHDC device of FIG. 5.

DETAILED DESCRIPTION OF PREFERRED EMBODIMENTS

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents that operate in similar manner to accomplish a similar purpose. Several preferred embodiments of the invention are described for illustrative purposes, it being understood that the invention may be embodied in other forms not specifically shown in the drawings.

Geostationary (GEO) satellites are generally understood to be satellites in geostationary orbit, with an orbital period the same as the Earth's rotation period. Therefore, they appear stationary from the Earth and earth-stations use fixed antenna to point to them. Satellites in other orbits are non-GEO satellites. They appear to be in motion from the Earth and earth-stations use tracking antennas to point to them. To allow continuity of communication with non-GEO satellites, multiple satellites are installed in non-GEO orbit, referred to as satellite constellation. Multiple antennas are used at an earth station to switch communications from the satellite that is leaving the field of view (descending satellite) to the satellite that is entering the field of view (ascending satellite).

In a practical situation, the number of antennas used with non-GEO satellite constellation in a given earth-station is at least two. More antennas are provided as spares in case one fails, or in order to provide rain diversity by spacing the antennas to span rain cells (i.e., antennas are physically located several hundred meters from other antennas so that if one antenna encounters rain, the other antenna is outside of the rain). FIG. 1(a) is an overview illustrating a 3-antenna SHDC system 100, according to an exemplary non-limiting embodiment of the present invention. The SHDC system 100 includes one or more SHDC devices 102, multiple antennas 104 ($A_1$, $A_2$, $A_3$), an ACU 106, and a local area network (LAN) 108 or in some cases wide area network (WAN). In the embodiment shown, the 3-antenna SHDC system 100 includes a first SHDC device $SHDC_1$ cascaded with a second SHDC device $SHDC_2$. Each of the first SHDC device $SHDC_1$ and the second SHDC device $SHDC_2$ includes a satellite hand-off device (SHD) and a diversity combiner (DC), as shown in FIG. 5.

As shown, an output from each of the first and second antennas $A_1$, $A_2$ are inputs $IN_1$, $IN_2$ to the first $SHDC_1$. The output from the first $SHDC_1$ is a first input $IN_1$ of the second $SHDC_2$, and the third antenna $A_3$ is a second input $IN_2$ to the second $SHDC_2$. The ACU 106 is in communication with and can control all of the antennas $A_1$, $A_2$, $A_3$. The ACU 106 controls the sequence of antenna 104 movements including hand-off, tracking the satellite as it continues in its orbit, and the left antenna dropping its signal with the current satellite and beginning to move to find a new ascending satellite. The ACU 106, SHDCs 102 (SHD and/or DC) can each have a computing device, such as a processor or processing device and can have computer software that permits the accessing of data from an electronic information source, or exchange of data among themselves, via the LAN or WAN 108, typically using Simple Network Management Protocol (SNMP) messages. The LAN/WAN 108 connects the SHDCs 102 to each other for monitor and control and share inputs signal levels for antenna failure analysis. The SHDCs 102 are also in communication with the ACU 106, either via the LAN/WAN 108 or other. The SHDC device 102 can monitor the status of the antenna failure from the ACU 106. The ACU 106 can be separate from the SHDCs 102 (as shown) or can incorporate an SHD and diversity combiner. The software and the information in accordance with the invention may be within a single, free-standing computer or it may be in a central computer networked to a group of other computers or other electronic devices. The software and data may be stored in a storage device, such as a database, memory, computer hard drive, or other appropriate data storage device. Unless otherwise stated, the steps performed herein are all performed automatically in real-time by the processor, without manual interaction.

FIG. 2 details orchestration of all 3-antennas 104 during a satellite pass and describes the purpose of their orientation as the satellites 5, 10 ascend from the left side and pass on to descend on the right side.

An antenna acquires the satellite once it ascends and tracks the satellite until it descends. So, the same antenna cannot be used to acquire a next ascending satellite at the same time it is tracking the descending satellite. Alternate antennas take the role of acquiring the ascending satellite. For this reason, the system 100 has an "even" pass (FIGS. 2(a)-2(e)) where $A_1$ acquires the ascending satellite, and an "odd" pass (FIGS. 2(f)-2(j)) where $A_2$ acquires the ascending satellite. Each pass has five stages or phases: handover, after handover, beginning of diversity combining, end of diversity combining and prepare for handover. During handover (FIG. 2(a)), the first antenna $A_1$ tracks the ascending satellite 5, and the second and third antennas $A_2$, $A_3$ track the descending satellite 10. In the after handover phase (FIG. 2(b)), the first antenna $A_1$ tracks the ascending satellite 5, and the second and third antennas $A_2$, $A_3$ move to the satellite 5 (no signal). During handover, both satellites 5 and 10 are in the field of view. After handover phase indicates that the descending satellite 10 is no longer in the field of view and the antennas that were tracking the descending satellite will receive no signal.

During the beginning of DC phase (FIG. 2(c)), all the antennas $A_1$, $A_2$, $A_3$ track the satellite 5 as it ascends. All the antennas $A_1$, $A_2$, $A_3$ continue to track the satellite 5 until the end of DC (FIG. 2(d)), as it descends. During prepare for handover (FIG. 2(e)), the first and third antennas $A_1$, $A_3$ track the descending satellite and the second antenna $A_2$ moves to acquire the ascending satellite (no signal). Thus, at the end of the even pass, the antennas $A_1$, $A_2$, $A_3$ are in position for handover in an odd pass (compare FIGS. 2(a) and 2(j)), with $A_2$ prepared to acquire the ascending satellite 5 and $A_1$, $A_3$ tracking the descending satellite 10. DC occurs for the entire duration from beginning of DC to the end of DC.

For an odd pass, during handover (FIG. 2(f)), the first and third antennas $A_1$, $A_3$ track the descending satellite and the second antenna $A_2$ tracks the ascending satellite. After handover (FIG. 2(g)), the second antenna $A_2$ tracks the satellite and the first and third antennas $A_1$, $A_3$ move to the satellite 5 (no signal). For the beginning and end of DC (FIGS. 2(h), 2(i)), all the antennas $A_1$, $A_2$, $A_3$ track the satellite. During prepare for handover (FIG. 2(j)), the second and third antennas $A_2$, $A_3$ continue to track the descending satellite, and the first antenna $A_1$ moves to acquire the ascending satellite (no signal). Thus, at the end of the odd pass, the antennas $A_1$, $A_2$, $A_3$ are in position for handover in an even pass (compare FIGS. 2(a) and 2(j)), with $A_1$ prepared to acquire the ascending satellite 5 and $A_2$, $A_3$ tracking the descending satellite 10. Accordingly, the cycle returns to FIG. 2(a) to continuously repeat the even and odd passes again.

Thus, the system alternates between even and odd passes, and seamlessly transitions from the even pass to the odd pass, and from the odd pass to the even pass. Antennas take a finite time to move and point to new direction. Prepare for handover phase means one of the designated antenna can change its orientation from descending satellite 10 and be ready to acquire ascending satellite 5 in handover phase.

During the even passes, the first antenna $A_1$ is the primary or main antenna since it is assigned to track the ascending satellite, the second antenna $A_2$ is the secondary antenna and the third antenna $A_3$ is the backup. Once the first antenna $A_1$ acquires the new satellite 5, it treats it as the reference satellite until it descends, and continues to track it while it is descending. So the first antenna $A_1$ is responsible for the full path of that satellite 5, from when it first ascends to when it has descended. Thus, at Prepare for Handover (FIG. 2(e)), the first antenna $A_1$ remains with the descending antenna, and only the second antenna $A_2$ is available to track the newly ascending satellite, which it acquires at Handover in the odd pass (FIG. 2(f)). The third antenna $A_3$ operates as a backup in the event of a failure of the first antenna $A_1$, so the third antenna $A_3$ remains with the descending satellite and the first and third antennas $A_1$, $A_3$ only switch to the ascending satellite after the descending satellite has fully descended and the signal lost.

During the odd passes, the second antenna $A_2$ is the main antenna, and is therefore responsible for the full path of the then-ascending satellite. The first antenna $A_1$ becomes the secondary antenna, and the third antenna $A_3$ is the backup antenna.

Accordingly, the backup antenna $A_3$ operates the same as the secondary antenna (i.e., $A_1$ during even passes, and $A_2$ during odd passes), during all phases except for Prepare for Handover, when it continues to track the descending satellite with the main antenna (i.e., which is soon to be the secondary antenna).

Table 1 below details the functionality of both of the SHDC devices 102. When all 3 antennas 104 are active, the first $SHDC_1$ handles the satellite hand-off and also provides DC SNR gain and the second $SHDC_2$ combines the output of $SHDC_1$ and antenna $A_3$ to provide additional DC SNR gain. As mentioned above, each SHDC device is capable of SHD and DC functions, the table below outlines the functions as per the antenna movements in FIG. 2. When the input antennas point to same satellite in DC, the coherent combining of inputs lead to SNR gain. The gain provided can be used to address rain fade or achieve higher throughput.

signal level going below a threshold, differential power between antennas exceeding a threshold (to isolate weather induced fade common to all antennas) when pointed to the same satellite, a user input, etc. If $A_1$ or $A_2$ fails, $A_3$ replaces the role of the failed antenna. The ACU can detect antenna failure, and the SHDC determines that there is an antenna failure by continuously monitoring the antenna status from the ACU. In one embodiment, the SHDC can monitor only those antennas that are connected to its inputs. When an antenna failure is detected the SHDC device bypasses the other (good antenna) input signal to output without any modifications.

Table 2 below details how the 3-antenna scheme falls back to normal 2-antenna SHDC device when one of the antennas $A_1$, $A_2$, $A_3$ fails. Thus, the arrangement of SHDCs

TABLE 1

Function of SHDCs when all 3 antennas are active

| Antenna Pass | Phase | $SHDC_1$ | $SHDC_2$ |
|---|---|---|---|
| Even Pass (Pass-A) | Handover | SHD from Antenna-2 to Antenna-1 | Bypass $SHDC_1$ output |
| | After Handover | Output signal from Antenna-1 and wait for Antenna-2 to point to ascended satellite | Bypass $SHDC_1$ output |
| | Beginning to End of DC | DC of Antennas 1 & 2 | DC of $SHDC_1$ output and Antenna-3 |
| | Prepare for Handover | Output signal from Antenna-1 and wait for Antenna-2 to point to ascending satellite | Bypass $SHDC_1$ output |
| Odd Pass (Pass-B) | Handover | SHD from Antenna-1 to Antenna-2 | Bypass $SHDC_1$ output |
| | After Handover | Output signal from Antenna-2 and wait for Antenna-1 to point to ascended satellite | Bypass $SHDC_1$ output |
| | Beginning to End of DC | DC of Antennas 1 & 2 | DC of $SHDC_1$ output and Antenna-3 |
| | Prepare for Handover | Output signal from Antenna-2 and wait for Antenna-1 to point to ascending satellite | Bypass $SHDC_1$ output |

For instance as reflected in Table 1 during the Even Pass Handover phase, $SHDC_1$ has detected that the first antenna $A_1$ has picked up the ascending satellite and that the second and third antennas $A_2$, $A_3$ are idle since they have lost the descending satellite (FIG. 2(a)). Accordingly, the first $SHDC_1$ switches from the input signal $IN_2$ from $A_2$ to the input signal $IN_1$ from $A_1$, and the second $SHDC_2$ passes the $SHDC_1$ output (i.e., the input signal $IN_1$ from $A_1$) to the demodulator 109 (i.e., since $A_1$ is the only antenna with a signal, that output is passed to the demodulator 109 via $SHDC_1$ and $SHDC_2$), as noted in Table 1. That continues during the After Handover phase. In the Beginning to End of DC phases, the second and third antennas $A_2$, $A_3$ have acquired the ascending satellite, so $A_1$, $A_2$ and $A_3$ are all receiving signals. So the first $SHDC_1$ conducts diversity combining of the two input signals $IN_1$, $IN_2$ from antennas $A_1$, $A_2$, respectively. And, the second $SHDC_2$ conducts diversity combining of the output of $SHDC_1$ and the signal from $A_3$. At the Prepare for Handover Phase, the signal from $A_2$ is lost since $A_2$ moves to acquire the new ascending satellite, so $A_2$ is idle. $A_1$ and $A_3$ receive signals, but Prepare for Handover phase is only a few seconds of duration before the Handover phase; hence $SHDC_1$ outputs $A_1$ signal waiting for signal on $A_2$ to be ready and $SHDC_2$ passes the $SHDC_1$ output until the next DC begins.

Antennas have mechanical parts to track the non-GEO satellite, they also face wind loads and are subject to failure. Some methods of detecting antenna failures are: receive as in FIG. 1 provides the desired functionality of: (1) seamless satellite hand-off from descending satellite to ascending satellite; (2) overall DC SNR gain of 10 $\log_{10}(3)$ =4.7 dB (for three antennas) under normal conditions (when all antennas are active); and (3) DC SNR gain of 10 $\log_{10}(2)$=3 dB when one of the antenna fails.

TABLE 2

Function of SHDCs when one of the 3-antennas fails

| Failure | $SHDC_1$ | $SHDC_2$ |
|---|---|---|
| Antenna-1 | Bypass Antenna-2 | Acts as SHDC - SHD and DC with Antennas 2 & 3 as inputs |
| Antenna-2 | Bypass Antenna-1 | Acts as SHDC - SHD and DC with Antennas 1 & 3 as inputs |
| Antenna-3 | Acts as SHDC - SHD and DC with Antennas 1 & 2 as inputs | Bypass $SHDC_1$ output |

If the first antenna $A_1$ fails, the third antenna $A_3$ takes over for it. Thus as shown in Table 2, the first $SHDC_1$ will pass the signal from the second antenna $A_2$ through to the second $SHDC_2$ (since $A_1$ has failed). The second $SHDC_2$ will then perform SHD and DC based on the signals from the second and third antennas $A_2$, $A_3$. The SDHCs will operate accordingly when the second or third antennas fail.

FIG. 3 is an overview illustrating an N-antenna SHDC device, according to an exemplary embodiment of the present invention to provide a DC SNR gain of 10 $\log_{10}(N)$. DC SNR gain of $10 \log_{10}(N)$ assumes that receiver antenna gain overwhelms satellite transponder and/or sky noise, if this is not the case, DC SNR gain may be less than $10 \log_{10}(N)$ or there may even be negligible gain. The N-antenna SHDC device includes N−1 SHDC devices $SHDC_1$, $SHDC_2$, ... $SHDC_{N-1}$. Similar to the 2-Antenna SHDC device illustrated in FIG. 1, each of the N−1 cascaded SHDC devices illustrated in FIGS. 3(a) and 3(b) includes an SHD and a DC. FIG. 3(a) shows a cascaded form and FIG. 3(b) shows a balanced tree form of arranging the SHDC devices. In FIG. 3(a), the antennas are connected to or in communication with an N×N switching matrix, which is connected to or in communication with the SHDC in the same fashion as in FIG. 1, where the output from $SHDC_1$+ forms an input to the next SHDC device. In FIG. 3(b), the antennas are connected to or in communication with an N×N switching matrix. There are several columns of SHDCs. Each output of the switching matrix is connected to an input of a respective SHDC at a first column of SHDCs ($SHDC_1$-$SHDC_{N/2}$). The output from each of the SHDCs in the first column is connected to or in communication with an input of SHDCs in the subsequent (here, the second) column ($SHDC_{N/2-1}$-$SHDC_{N/4}$). Thus for instance, the top SHDC of the second column ($SHDC_2$) has a first input $IN_1$ of $SHDC_{N/2+1}$ that is the output of $SHDC_1$ from the first column, and a second input $IN_2$ from the next antenna.

The cascaded form (FIG. 3(a)) is the preferred method of arrangement as it is easier to deploy additional antennas and the logic is simple. The balanced tree form (FIG. 3(b)) has lesser latency, by a factor of $(\log_2(N)/N)$, compared to cascaded form, but it is more complex to add/remove additional antennas. In the balanced tree form of FIG. 3(b), the SHDC devices connected directly to antennas ($SHDC_1$ to $SHDC_{N/2}$) apply the non-geostationary satellite orbit associated delay/Doppler compensation to the inputs. Remaining SHDCs in the tree ($SHDC_{N/2+1}$ to $SHDC_{N-1}$) act as normal diversity combing units (with no delay/Doppler compensations).

As shown in FIGS. 3(a) and 3(b), an N×N switching matrix may precede the SHDC devices in order to allow an arbitrary number of satellite antennas to be removed from service (for example, due to antenna failures or routine maintenance).

Aided by the Two Line Element set (TLE) data, that defines position of an Earth-orbiting satellite at a given point in time, the ACU is responsible for: (1) Pointing to correct satellites involved at hand-off; and (2) Pointing multiple antennas to single satellite during diversity combining. In a satellite hand-off coordination, N−1 antennas point to the descending satellite while one antenna acquires the ascending satellite in the satellite hand-off phase. After the satellite hand-off is complete, the N−1 satellite antennas are re-pointed to the ascending satellite so that diversity combining may take place.

For example, as shown in FIG. 4(a), three antennas continue to point to the descending satellite while one antenna acquires the ascending satellite in the satellite hand-off phase. Continuing with this example, as shown in FIG. 4(b), the three antennas are re-pointed to the ascending satellite after the satellite hand-off is complete so that diversity combining of all four antennas may take place. To start a DC, all antennas should point to same satellite. DC can be performed with fewer than all the satellites, but the DC of N antennas gives an SNR gain of $10 \log_{10}(N)$. So to achieve maximum gain it is preferable to point all available antennas to same satellite. The antennas were pointing to descending satellite during hand-off, so re-pointing means making them point to the ascending satellite. As one of ordinary skill in the art would recognize, other antenna co-ordinations are possible.

The four antennas shown in FIGS. 4(a) and 4(b) utilize a 4-Antenna SHDC device as illustrated in FIG. 3(a) or 3(b) with N=4. FIG. 4(c) shows post combining receive antenna pattern, as the spacing can be 2-6 orders of magnitude greater than the carrier wavelength being received, there will be many more grating lobes of decreased width as antenna spacing is increased. The narrowness of the grating lobe (as a function of angular displacement) requires the adaptive algorithm to adjust the phase difference between the antennas very precisely. The adaptive algorithms typically converge only in an average sense; there is additive "algorithm noise".

As illustrated in FIG. 5, to eliminate sensitivity of antenna receive pattern with respect to the phase noise (for example performing DC when both input levels are not similar results in a lower DC SNR compared to individual SNRs) between antennas, "diversity selection" is used, rather than "diversity combining." For instance, an antenna selector is used (perhaps with hysteresis to avoid frequent switching) when antenna spacing is large, rather than using diversity combiner Z 513. More specifically, the output switch 517 is pointed to X or Y to select an antenna with the lowest rain fade (e.g., an antenna in rain has a lower signal than an antenna that is not in rain; if neither antenna is in rain, then there is no rain fade). This is termed as Diversity Selection (DS) 517, during which we continue to use all adaptive algorithms to align delay, phase, frequency and amplitude between the antenna paths in order to minimize discontinuity during a switch from one antenna to another. This has application to rain diversity, where we separate antennas to span a rain cell (a "rain cell" being a geographic zone for which there is an up-current of warm and moist air, which upon condensation at cooler higher altitudes, results in precipitation). By selecting the antenna with the lowest rain fade, the best signal can be utilized; whereas diversity combining the rain signal and the non-rain signal will produce a poorer signal. Thus, DS can be substituted for DC in special circumstances (e.g., when antenna spacing is large).

FIG. 5 illustrates how this selection between seamless DC and DS can be done. It shows the events from Handover phase to Prepare for Handover phase that repeat for every satellite pass. The signal processing blocks are shown within the SHDC devices 102. $IN_1$ and $IN_2$ are the two inputs coming from antennas $A_1$, $A_2$, respectively. The inputs $IN_1$, $IN_2$ can be L-band for instance, and the RF to Zero Intermediate Frequency (ZIF) converts the signal to digital format. The circuit has linearly varying fractional delay filters for delay compensation, logic to use common resources for both SHD and DC functions, k1 and k2 multipliers to avoid demodulator synchronization loss during DC exit and inputs from navigational sensors. The RF signals received from the antennas is first brought to baseband I/Q 501 for signal processing. Programmed frequency NCOs (LFM) 502 negate the Doppler in received signals to near zero. They are then decimated 503 and passed through delay blocks 504 to have near zero differential delay.

An integer sample delay change can be created by repeating a sample or skipping a sample, which corresponds to increasing or decreasing a delay respectively (i.e., delay is increased by adding a sample, and decreased by discarding a sample). However, this can cause a disturbance or a glitch in the signal leading to loss of information. Hence, delay has to be varied smoothly (e.g., linearly) by introducing fractional delays to the input signals $IN_1$, $IN_2$. Linearly varying fractional delay filter 505 introduces fractional delay according to the negative of delay change due to satellite movement and then accumulates them into path delay blocks once they cross an integer. For instance, finite impulse response (FIR) filters can be designed with a desired group delay. Here, fractional delay filtering refers to using an all-pass FIR filter with a bank of coefficient-sets corresponding to different fractional delays.

For example, if we have a filter 505 with a bank of coefficient-sets corresponding to fractional sample delays (0, 0.1, 0.2, 0.3, . . . , 0.9, 1.0), coefficient-sets can be switched such that delay changes gradually from 0 to 1 sample (in steps of 0.1 sample). The rate at which the coefficient-sets are switched is determined by the rate at which path delay changes due to satellite movement obtained from TLE data. When one sample delay is reached, the read pointer in path delay buffer 504 is corrected by 1 sample and the filter corresponding to 0 delay is used to allow next smooth delay correction. Multiplexers P 507 and Q 508 select the input signals as tabulated in table 509 depending on Even or Odd pass of SHDC device as in FIG. 2. The SHDC device can figure out the odd/even pass without any information from ACU. Before the start of SHD (i.e., ascending satellite is yet to enter the field of view), only descending satellite transmits the signal. The SHDC device checks the power received from both antennas before start of SHD, since only one of the antenna will have a signal, it determines whether it is in odd or even phase automatically. This check is done after power-ON and also before every SHD to handle cases where antennas may get swapped after a maintenance. Q always points to the signal from the acquired satellite.

Table 509 (FIG. 5) shows the outputs P and Q for multiplexers 507, 508, respectively. So at Handover, Q represents the signal for $A_1$ (which is tracking the ascending satellite) and P represents the signal for $A_2$ (which is tracking the descending satellite). Then at Prepare for Handover (Table 509), Q is $A_{2B}$ (meaning the signal from $A_2$) and P is $A_{1B}$. $A_{1B}$ is shown in FIG. 5 at the output of multiplier 516A, and A2B is output from multiplier 516B, and thus have received fine delay correction. In addition, $A_{1B}$ and $A_{2B}$ are each an input to each of the multiplexers 507, 508. The multiplication blocks 516a, 516b correct for differential Doppler (residual Doppler differences) that is estimated by the DPLL 516.

Fractional adaptive filter 510 aligns the differential amplitude, differential fractional delay of the signal at P to that of Q for SHD and DC operations. At the beginning of SHD (handover phase of FIG. 2), Q 508 points to the descending satellite, P 507 points to the ascending satellite, and the output switch 517 points to Y, the signal from the descending satellite (since at Handover, the signal from the ascending satellite has not been picked up yet). Once digital phase locked loop (DPLL 516) tracks the differential Doppler (phase and frequency) of P with respect to Q and the delay locked loop (DLL, adaptive filter 510) aligns the differential amplitude and delay of P with respect to Q, the adaptive filter coefficients are frozen and the output switch 517 is pointed to X, this switching refers to seamless hand-off. Thus at After Handover, the main antenna has acquired the ascending satellite, so the switch 517 moves from the signal Y for the descending satellite, to the signal X for the ascending satellite.

At the After Handover phase of FIG. 2, since the frozen adaptive filter is required for the next DC operation, the frozen coefficients are transferred 511 to array of fractional delay filters 512, Q 508 is pointed to the ascending satellite to make outputs X and Y identical and then position the output switch 517 back to Y to mark the end of SHD. Since the switch 517 is moved away from X, the adaptive filter 510 is freed up for diversity combining (i.e., as noted above, after the filter 510 adapts the ascending satellite to descending satellite, its coefficients are frozen and transferred to 511 and Q 508 is also pointed to ascending satellite to make X and Y same at the end of SHD; but since they are same, there is no need for adaptation and hence the filter is freed up and can conduct DC by moving switch to Y). During DC the switch is pointed towards Z, which is a function of both X and Y (Diversity combined output of both antennas). At the beginning of the DC phase of FIG. 2, Q 508 points to ascending satellite, P 507 points to same ascending satellite via repointed antenna and output switch 517 points to Y. Once the DPLL and DLL settles, the position of output switch 517 is pointed to position Z, the output of coherent adder 513, to mark start of DC operation.

At the end of DC phase of FIG. 2 (when the re-pointed antenna has to go back to acquire the next ascending satellite) the output switch 517 is positioned back to Y. Accordingly, the switch 517 at the output is selected depending on the phase of operation SHD or DC or bypass or DS. The SHDC can know the phase for a given communication link, based on satellite movement and transmitter/receiver locations. The time schedule of the phases is precomputed and communicated to all devices in the network to work in a synchronized manner. Switching can be done depending on the phase based on the time schedule. At prepare for handover phase of FIG. 2, SHDC waits for the ascending satellite.

In summary, the switch 517 points to the active antenna; except during diversity combining (performed by the adder 513) it switches to the diversity combining of the antennas on Z, and it briefly points to X during Handover operation. During diversity selection it points to X or Y, whichever has the lowest rain fade input. Since both antennas point to same satellite during DC, the signal levels received from them are expected to be same. A level difference exceeding a threshold e.g., 5 dB between them can be attributed to rain fade for Diversity Selection of the input with lower fade.

The signal is then again converted to RF 514 for providing the output to next SHDC device 102 (FIG. 1) or a demodulator 109 (FIG. 1). The scaling operation of $\beta$ and $\beta^{-1}$ ensure that adaptive filter coefficients do not overflow. The Acquisition block 515 estimates the differential delay/Doppler of signal from the ascending satellite with respect to the signal from the descending satellite during SHD and of signal re-pointed antenna with respect to the signal from the already pointed antenna during DC. The digital phase locked loop (DPLL 516) tracks the differential Doppler during SHD and DC operations. The differential delay/Doppler estimation, tracking and fractional delay adaptation 510 can be conducted in a suitable manner, such as discussed in U.S. Pat. No. 7,522,877, the entire contents of which is hereby incorporated by reference. As such, the techniques used in accomplishing the seamless hand-off and diversity combining are done without any prior knowledge or assumption of the type of information in the signal from transmitter (modulator agnostic) and without any feedback from the demodulator. Hence, the operations of SHDC are done entirely in the physical layer.

The programmed delay (linearly varying fractional delay filter illustrated in FIG. 5) and Doppler (Programmed frequency NCOs illustrated in FIG. 5) allow the SHDC device to see nearly zero delay and Doppler difference during satellite hand-off (from using the descending satellite to using the ascending satellite). The nearly constant latency allows the use of off-the-shelf demodulators 109 that expect near-constant latency of the transmitted signal.

For example, let's assume that the delay in the satellite path (i.e., the time it takes for a signal to go from the transmitter to the satellite and then be received back at the receiver) changes from 100 ms to 115 ms from ascending position to descending position, so there is a differential of 15 ms. In that case, the SHDC device introduces a reverse delay for the same duration from 17 ms to 2 ms (we always maintain some positive delay as negative delays are not practical). In this example, the latency without SHDC changed from 100 ms to 115 ms, whereas the overall latency with SHDC is always 117 ms (absolute latency is near constant). That is, the delay in the satellite path when the satellite is at the ascending position will now be 117 ms (the original 100 ms, plus the 17 ms delay that is introduced by the invention). And, the delay in the satellite path when the satellite is in the descending position will also be 117 ms (the original 115 ms, plus a 2 ms delay that is introduced by the invention). Thus, the delay change from the ascending to descending position, is 15 ms without compensation; but the delay change with compensation is zero (absolute latency change is near 0). Due to prediction inaccuracies and discrete nature of the delay compensation, there can be a residual uncompensated delay variation (perhaps a few micro-seconds, typically <200 us). Hence, we call it near constant latency.

In this example, the greatest delay is when the satellite is in the descending position, when a 115 ms delay is encountered. Satellites move at a known rate, and the periodicity of the satellite through air is fixed. So the expected delay of 115 ms can be determined in advance by knowing what time the satellite will be at the descending position and other variables, such as latitude and longitude. In addition as discussed above, the delay is slowly reduced over time. So while the delay might initially be 17 ms when the satellite is in the ascending position, it is gradually (by use of the fractional delay periods) reduced to a 2 ms delay by the time the satellite is in the descending position.

In order to acquire the ascending satellite, the receiver may utilize an SHDC device. It may be more cost effective, however, for the leftmost satellite to utilize the programmed delay and Doppler sections of the SHDC device at the transmitter (note that the SHDC device as described in the patent specification applies only to receivers). Programming of delay and Doppler, when applied at the transmitter (as in FIG. 6) allows off-the-shelf receivers to be used on the non-GEO satellite constellation. The Modulator1 of FIG. 6 introduces inverse delay and Doppler variations corresponding to the path through satellite 601. Similarly, Modulator2 introduces inverse delay and Doppler variations corresponding to the path through satellite 602. This results in seeing near constant delay and Doppler through both paths to the receiver. Other than using antennas that track the satellites in the non-GEO constellation, the receivers appear to be receiving signals from stationary satellites (as the delay and Doppler variations are compensated for at the transmitters). Because the programmed delay and Doppler sections require fewer computing resources than an entire SHD and DC, utilizing the programmed delay and Doppler sections in the transmitter require fewer resources than a SHDC device (that is applied at the receiver). There will, however, be a phase difference (in addition to small residual delay and Doppler) resulting in satellite hand-off not being "seamless". This phase difference (and any residual delay difference) is acquired by the phase-locked loop (PLL) and the delay-locked loop (DLL) of the SHDC device. These blocks are labelled "PLL-phase/frequency tracking" and "Fractional adaptive filter" respectively in FIG. 5.

Thus, the delay and Doppler compensation can be performed on the transmitter side, by the Modulator1 and Modulator2 using a decompensation technique. By making small changes to the transmitter, operations denominators can be used on the receiver side at the demodulator. As illustrated by FIG. 6, some operations of the invention can be done on the transmit side as well to minimize the delay/Doppler variations due to non-geostationary satellites.

The TLE data, satellite hand-off instance, transmitter and receiver locations determine the delay/Doppler compensation from beginning of satellite pass to end of satellite pass. The TLE data is used to estimate the orbiting satellite position and hence delay/Doppler associated with it. The TLE data is received by the system over the LAN from a network management system (NMS) and can be received by the ACU. For static terminals, the SHDC device precomputes the programmable delay/Doppler variations before start of hand-off. For quasi-stationary or moving platform (FIG. 7), the SHDC device continuously updates the delay/Doppler compensation based on inputs from the sensors 506 of FIG. 5, such as navigation (GPS), tilt, inertial (accelerometer and gyro), etc.

The inputs from the navigational and inertial sensors can be used to address SHDC for receiver. For a static earth-station receiver the latitude, longitude and altitude of earth station are fixed. For a moving receiver platform, the location parameters continuously change based on motion. Navigational sensors 701 are used to obtain the location details continuously. The sensors can be placed on the platform that houses the receiver equipment. The equipment (i.e., ACU or SHDC) can communicate with the sensors directly. However, to avoid a conflict of multiple equipment accessing the sensors simultaneously, a common database is maintained by NMS and updated periodically. These sensors are typically used by the ACU to correct the satellite pointing. The SHDC device 102 obtains these inputs by communicating with various on-board or cloud-based resources. Satellite motion relative to earth station creates changes in path distance (propagation delay from Modulator at transmitter to Demodulator at receiver of FIG. 7) and Doppler effect. Delay affects the symbol timing of received signal, while Doppler affects the frequency of the received signal. Off-the-shelf demodulators 109 designed for geostationary applications cannot tolerate the high delay/Doppler changes in signals from non-geostationary satellites. Hence, compensation of delay and Doppler is essential to use off-the-shelf demodulators in non-geostationary scenarios. As noted above, for a moving receiver platform, the location parameters continuously change based on motion. Navigational sensors 701 are used to obtain the location details continuously and the delay/Doppler compensation is done.

During rain, modems using adaptive coding and modulation (ACM) automatically shift to a lower modulation and coding (MODCOD). It is important that the SHDC device (which can provide nearly a gain of 10 log 10(N) in SNR for an N-antenna SHDC device) be compatible with the ACM adaptation rate. While the ACM can adapt to a step increase in diversity combining gain and switch to a higher MOD-COD without causing the demodulator 109 to unlock, it cannot do so in case of a step decrease in diversity gain. Hence, in 2-antenna SHDC device, diversity combining gain may be removed gradually using the 'Gradual DC Exit' multipliers ($k_1$ 518 and $k_2$ 519) shown in FIG. 5. During DC, both inputs point to the same satellite, so both of the multipliers are given an equal weightage of 0.5. During end of DC, while $k_1$ 518 is gradually driven to 0, the other multiplier $k_2$ 519 is simultaneously driven to 1 as shown in graph 520 of FIG. 5. Thus, the net output signal has a gradual change in SNR to avoid demodulator synchronization loss.

Graph 520 shows the changes of $k_1$ and $k_2$ during DC exit as a waveform. During DC Z=0.5X+0.5Y, due to coherent addition SNR of Z is 3 dB higher than X or Y. If the output switch 517 is suddenly pointed from Z to Y to exit DC, then the demodulator 109 cannot handle 3 dB reduction in SNR leading to synchronization loss. By gradual exit, we mean that the contribution of X (re-pointed satellite) is gradually reduced and contribution of Y (acquired satellite) is gradually increased, i.e., during DC Z=0.5X+0.5Y, at mid of gradual exit Z=0.25X+0.75Y and at end of exit Z=0X+1Y=Y. So, the output switch 517 can now move from Z to Y. In SHDC, the gradual DC exit happens at 0.3 dB/s. Since the SNR change in SHDC is less than the ACM adaptation rate of modems (about 1 dB/s), the demodulators 109 do not lose synchronization. In N-antenna diversity combining, sequential switching of diversity antennas (as well as gradual removal of diversity combining) may be provided.

FIG. 8 illustrates the spectrum of signals at various stages of processing by the SHDC device of FIG. 5, for the purpose of illustrating the invention without intending to limit the invention. A 60 MHz bandwidth signal at 1200 MHz RF with 200 kHz Doppler is considered for illustration as inputs $IN_1/IN_2$. The RF signal in FIG. 8(a) passes through converter 501 and gets converted to base-band signal FIG. 8(b), then gets corrected for Doppler using the LFM 502 with output as in FIG. 8(c). The delay changes in blocks 504, 505, 510 and 512 do not alter the frequency response, hence their output spectra are also similar to FIG. 8(c). The solid spectrum in FIG. 8(d) shows the spectra at X and Y positions of output switch and the dashed spectrum shows the DC output having about 3 dB SNR gain due to coherent combining at the adder 513 Z. The signal from output switch 517 is again converted back to RF at 514 as in FIG. 8(e), the dashed spectrum is the RF signal with DC and the solid spectrum is the RF signal without DC.

In summary, some of the improvements applicable to the exemplary embodiments herein relate to 1) utilizing N−1 two-channel SHDC devices to achieve an N-antenna SHDC device, 2) utilizing programmed delay and Doppler at the transmitter in order to use off-the-shelf receivers (demodulators 109), 3) utilizing the information from sensors to achieve SHDC on a moving platform and 4) removing diversity combining SNR gain gradually to be compatible with the ACM adaptation rate.

The invention achieves a number of benefits, including: A) support of other (non-MEO) non-geostationary orbit satellite constellations, B) support for multiple (>2) antenna receivers, C) readily adaptive to an antenna being in and out of service (e.g. failed antenna), D) using common resources for both SHD and DC operations (including the sequencing of passing the inputs via multiplexers P & Q to use same resources for both SHD and DC operations), E) gradual DC exit (by using $k_1$ and $k_2$ multipliers) to avoid synchronization loss in demodulators 109 due to sudden drop in SNR (at a rate faster than allowed by ACM), F) Diversity Selection (DS, rather than DC) when antennas are spaced very far apart, G) in addition to Doppler compensation (via LFM), we now use delay compensation (via linearly varying fractional delay filter) that allows use of off-the-shelf demodulators 109 that expect near-constant latency of transmitted signal, and H) use of inputs from navigational and inertial sensors to address SHDC for receiver on a quasi-stationary or fast moving platform.

Though it is desirable to select near-zenith satellites for beam switching/hand-off, actual satellites chosen are based on a host of considerations. For example, LEO satellites have nearly half-orbit dark durations (when solar panels will not receive radiant energy). In some (battery-mass minimizing) designs, all but critical electronics are switched off for these durations. Additionally, electronics switch-off include durations where a LEO satellite is transiting a radiation zone such as the South Atlantic Anomaly or Polar Horn. At any given ground station location, the list of usable satellites are further restricted by avoiding satellites that can have solar outages or those that can have interference from GEO satellites. The final selection, from this reduced list of satellites, is based on season, time-of-day and weather. The words "ascending" and "descending" satellites mentioned in the description above should be therefore interpreted appropriately for the particular design of the satellites and the constellation.

The foregoing description and drawings should be considered as illustrative only of the principles of the invention. The invention may be configured in a variety of ways and is not intended to be limited by the preferred embodiment. Numerous applications of the invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

We claim:

1. A customer satellite terminal that provides seamless hand-off from a descending satellite to an ascending satellite, the satellite terminal comprising:
    a first satellite hand-off diversity combiner (SHDC) that receives a first signal from a first satellite antenna and a second signal from a second satellite antenna, said first SHDC conducting satellite hand-off and diversity combining of the first signal and the second signal to provide a first output; and
    a second SHDC that receives the first output and a third signal from a third satellite antenna, said second SHDC conducting satellite hand-off from the descending satellite to the ascending satellite and diversity combining of the first output and the third signal to provide a second output.

2. The customer satellite terminal of claim 1, wherein said first and second SHDC each provide physical layer seamless hand-off.

3. The customer satellite terminal of claim 1, wherein said first and second SHDC each provide diversity signal-to-noise ratio gain.

4. The customer satellite terminal of claim 1, wherein the descending satellite and the ascending satellite are non-geostationary orbit satellite constellations.

5. The customer satellite terminal of claim 1, wherein the descending satellite and the ascending satellite are non-Medium Earth Orbit (MEO) satellite constellations.

6. The customer satellite terminal of claim 1, further comprising an antenna control unit, said antenna control unit detecting failure of said first, second or third satellite antenna.

7. The customer satellite terminal of claim 1, wherein the SHDC detects failure of said first, second or third satellite antenna, wherein the SHDC ignores the signal from the failed first, second or third satellite antenna.

8. The customer satellite terminal of claim 1, wherein said first and second SHDC each comprise a satellite hand-off device (SHD) that conducts satellite hand-off, a diversity combining (DC) device that conducts diversity combining, and a diversity selection device to align delay, phase, frequency and/or amplitude on the input signals.

9. The customer satellite terminal of claim 8, said first SHDC further comprising a first switch to selectively connect the first signal and the second signal to the satellite hand-off device and the diversity combining device of said first SHDC.

10. The customer satellite terminal of claim 9, said second SHDC further comprising a second switch to selectively connect the first SHDC output and the third signal to the satellite hand-off device and the diversity combining device of said second SHDC.

11. The customer satellite terminal of claim 10, wherein the first and second SHDC devices each comprise a first multiplexer and a second multiplexer that switch the computational resources between SHD and DC functions.

12. The customer satellite terminal of claim 1, wherein said first and second SHDC each comprise a diversity combining (DC) device that conducts diversity combining, wherein diversity combining gain is gradually removed using a first multiplier and a second multiplier to avoid demodulator synchronization loss, which may occur due to the sudden drop in signal-to-noise ratio at a rate faster than allowed by adaptive coding and modulation (ACM).

13. The customer satellite terminal of claim 1, wherein said first and second SHDC each further comprise a fractional delay filter that introduces a fractional delay variation to the first, second and third signals respectively, to provide near-constant latency to the first, second and third signals.

14. The customer satellite terminal of claim 1, said first and second SHDC each receiving inputs from navigational and/or inertial sensors to compensate for delay and Doppler on moving platforms.

15. The customer satellite terminal of claim 1, said first and second SHDC each has Diversity Selection (DS) of inputs in addition to Diversity Combining (DC).

16. A customer satellite terminal that provides seamless hand-off from a descending satellite to an ascending satellite, the satellite terminal comprising:
a satellite hand-off diversity combiner (SHDC) that receives a first signal from a first satellite antenna and a second signal from a second satellite antenna, said SHDC conducting satellite hand-off from the descending satellite to the ascending satellite and diversity combining of the first signal and the second signal to provide an output, and
a demodulator receiving the output of the SHDC.

17. The customer satellite terminal of claim 16, wherein the SHDC device comprises a first multiplexer and a second multiplexer that switch the computational resources between SHD and DC functions.

18. The customer satellite terminal of claim 16, wherein said SHDC device comprises a diversity combining (DC) device that conducts diversity combining, wherein diversity combining gain is gradually removed using a first multiplier and a second multiplier to avoid demodulator synchronization loss which may occur due to the sudden drop in signal-to-noise ratio, at a rate faster than allowed by adaptive coding and modulation (ACM).

19. The customer satellite terminal of claim 16, wherein said SHDC device further comprises a fractional delay filter that introduces a fractional delay variation to the first and second signals respectively, to provide near-constant latency to the first and second signals.

20. The customer satellite terminal of claim 16, said SHDC device receiving inputs from navigational and/or inertial sensors to compensate for delay and Doppler on moving platforms.

21. The customer satellite terminal of claim 16, said SHDC device has Diversity Selection (DS) of inputs in addition to Diversity Combining (DC).

22. The customer satellite terminal of claim 16, wherein the first satellite antenna and the second satellite antenna alternately acquire the ascending satellite and track the ascending satellite until it has fully descended.

23. The customer satellite terminal of claim 16, wherein the first satellite antenna and the second satellite antenna each alternate between a first mode and a second mode, wherein in the first mode the first and second satellite antenna acquire the ascending satellite and track the ascending satellite through handover and diversity combining until it has fully descended, and in the second mode the first and second satellite antenna acquire the ascending satellite after handover of the descending satellite and track the ascending satellite until after diversity combining and acquires the newly ascending satellite after diversity combining of the descending satellite.

24. The customer satellite terminal of claim 23, further comprising a first pass in which the first satellite antenna is in the first mode and the second satellite antenna is in the second mode, and a second pass in which the first satellite antenna is in the second mode and the second satellite antenna is in the first mode.

25. A customer satellite terminal that provides seamless hand-off from a descending satellite to an ascending satellite, the satellite terminal comprising:
a satellite hand-off diversity combiner (SHDC) that receives a first signal from a first satellite antenna and a second signal from a second satellite antenna, said SHDC conducting satellite hand-off from the descending satellite to the ascending satellite and diversity combining of the first signal and the second signal to provide an output, wherein the descending satellite and the ascending satellite are non-geostationary orbit satellite constellations.

* * * * *